3,010,785
ION-EXCHANGE OF ZEOLITES

Richard M. Barrer, Bromley, England, and David C. Sammon, Lossiemouth, Moray, Scotland, assignors to Union Carbide Corporation, a corporation of New York
No Drawing. Filed Apr. 17, 1956, Ser. No. 578,596
8 Claims. (Cl. 23—31)

This invention relates to a method for cation-exchanging three-dimensional crystalline zeolites and to a means for separating cations by this exchanging method.

The process currently finding application for ion-exchanging zeolites involves leaching of the zeolite with an aqueous solution of the exchanging cation salt. Often this ion-exchange is incomplete due to an equilibrium being established between the original form and the cation-exchanged form of the zeolite.

It is an object of this invention to provide a method for ion-exchanging zeolites wherein the previously-described equilibrium is shifted in favor of more complete ion exchange.

It is another object to apply the ion-exchanging technique of this invention to the quantitative separation of cations.

Other objects will be apparent from the disclosure.

By the method of this invention, zeolites are ion exchanged by bringing them into intimate contact with a solution containing the exchanging cations, and containing anions that form a substantially insoluble precipitate with the exchangeable cations of the zeolite.

The invention may be more clearly understood by the following examples. Because silver ions normally exchange with zeolites preferentially to sodium ions, the reverse process was employed to show the effectiveness of the subject invention.

A silver-exchanged form of sodium zeolite A (a synthetic zeolite described and claimed in pending application Ser. No. 400,388, now Patent No. 2,882,243) was prepared having a silver ion to sodium ion ratio of 100. Five grams of this material were treated with a solution of sodium chloride containing 11.7 grams of sodium chloride per 100 milliliters of water. A curdy suspension of silver chloride formed almost immediately. The supernatant liquid was decanted, and the solids were treated with concentrated ammonium hydroxide to dissolve the silver chloride precipitate. The zeolite was then filtered and washed with ammonium hydroxide. Chemical analysis indicated a 91 mole percent exchange of silver cations by sodium cations to give a silver ion to sodium ion ratio of 0.011.

This process was repeated with a silver-exchanged form of sodium zeolite X (a synthetic zeolite described and claimed in pending application Ser. No. 400,389, now Patent No. 2,882,244) having silver ion to sodium ion ratio of 91. Analysis of the product indicated a 65 mole percent exchange of sodium cations for silver cations to give a silver ion to sodium ion ratio of 0.25.

The process of this invention also finds application in the quantitative separation of ions.

Zeolites consist basically of three-dimensional frameworks of $SiO_4$ and $AlO_4$ tetrahedron. The tetrahedra are cross-linked by the sharing of oxygen atoms so that the ratio of oxygen atoms to the total of the aluminum and silicon atoms is equal to two. The electrovalence of the tetrahedra containing aluminum is balanced by the inclusion in the crystal of a cation. One cation may be exchanged for another by standard ion-exchange techniques. The spaces between the tetrahedra are occupied by water molecules prior to dehydration.

Not all cations will cation-exchange with the zeolites. Some cations are too large to enter the zeolitic crystal framework. Other cations possess too little energy to enter the structure; cations already present in the structure tend to repel the entering cations.

Thus, when different cations are present in the same solution, partial separation of the ions is possible on the basis of cation size or cation energy, or both. Treatment with a zeolite will result in exchange with the cations of such size and energy as are capable of exchange, any other cations remaining in solution. However, when this method of separation is employed, equilibrium conditions prevent total separation, and the exchanged cations from the zeolite serve to further contaminate the remaining solution. Appication of the cation-exchange technique of this invention solves these problems and makes such separations quantitatively, as may be seen from the following examples.

The zeolite analcite ($NaAlSi_2O_6 \cdot H_2O$) used in these experiments was prepared hydrothermally from a gel of analcite composition under alkaline conditions at 200° C. This hydrothermal growth of analcite is described in J. Chem. Soc. 1561 (1952). The sodium ions in analcite may be replaced partially or completely by silver ions. The substantially completely silver-exchanged analcite is known as silver analcite and may be represented by the formula, $AgAlSi_2O_6 \cdot H_2O$. The crystalline zeolite analcite is also described in Dana's Manual of Mineralogy, 15th edition, John Wiley & Sons, New York, 1941, page 300.

The silver-analcite used in this work was prepared by grinding the above-prepared analcite with about ten times its weight of $AgNO_3$ and then heating the mixture at 220–230° C. in an open beaker enclosed in an electrically heated furnace for about four hours. This fusion treatment was then repeated. The mixture was then cooled to room temperature, immersed in water to dissolve the impurities, filtered, washed and air-dried.

A blank correction of 1–2 mg. was obtained by heating CsCl and water at 110° C. for 16 hours. The resulting solution was evaporated to dryness and weighed. Weight of the residue minus weight of the original salt gave the blank correction useful for the method of evaluating, by evaporation, the reactions of CsCl mixtures with silver-analcite.

Portions of the silver analcite were added to solutions of sodium and cesium chlorides in water, in the proportions indicated in Table I, in a glass tube which was then sealed. The tube was placed in an electric oven and heated at the temperature and for the time indicated in Table I. The tube was revolved continuously during the heating to provide thorough mixing of the contents. The tube was then cooled to room temperature, the material removed, and the analcite and silver chloride separated from the mother liquor by filtration. The filtrate was evaporated to dryness and weighed. Subtraction of the initial weight of cesium chloride from the residue weight gave a weight equal to or less than the above-determined blank in every case. These results are also shown in Table I.

TABLE I

*Separation of NaCl-CsCl mixtures in a sealed tube using silver-exchange analcite*

| Reaction mixture No. | Ag-analcite weight (mg.) | NaCl weight (mg.) | CsCl weight (mg.) | Solvent (ml.) | Oven conditions | | Total residue (mg.) | Residue-weight CsCl (mg.) |
|---|---|---|---|---|---|---|---|---|
| | | | | | Time (hr.) | Temp. (° C.) | | |
| 1 | 136.6 | 13.5 | 103.9 | 5(H$_2$O) | 24 | 110 | 104.6 | 0.7 |
| 2 | 136.9 | 12.3 | 34.7 | 5(H$_2$O) | 24 | 110 | 35.7 | 1.0 |
| 3 | 334.2 | 35.7 | 51.7 | 2(H$_2$O) | 28 | 85 | 52.8 | 1.1 |
| 4 | 361.1 | 50.5 | 54.9 | 10(CH$_3$OH) | 18 | 95 | 55.7 | 0.8 |
| 5 | [1] 388.0 | 34.2 | 54.7 | 2(H$_2$O) | 25 | 85 | 55.7 | 1.0 |

[1] Reaction vessel was a covered beaker.

By similar techniques, potassium was separated from cesium ions, and rubidium was separated from cesium ions. The pertinent data are given in Tables II and III respectively.

TABLE II

*Separation of KCl-CsCl mixtures in a sealed tube using silver-exchange analcite*

[Blank equals 1 to 2 milligrams]

| Reaction mixture No. | Ag-analcite weight (mg.) | KCl weight (mg.) | CsCl weight (mg.) | Solvent (ml.) | Oven conditions | | Total residue (mg.) | Residue-weight CsCl (mg.) |
|---|---|---|---|---|---|---|---|---|
| | | | | | Time (hr.) | Temp. (° C.) | | |
| 1 | 126.5 | 14.1 | 35.4 | 5(H$_2$O) | 24 | 110 | 35.3 | −0.1 |
| 2 | 126.7 | 14.0 | 37.0 | 5(H$_2$O) | 24 | 110 | 36.2 | −0.8 |
| 3 | 146.1 | 15.2 | 34.5 | 5(H$_2$O) | 24 | 110 | 34.0 | −0.5 |
| 4 | 274.0 | 51.3 | 68.1 | 10(CH$_3$OH) | 18 | 95 | 67.1 | −1.0 |
| 5 | 420.2 | 15.6 | 36.2 | 5(H$_2$O) | 24 | 110 | 36.2 | −0.0 |
| 6 | 442.2 | 34.9 | 43.6 | 2(H$_2$O) | 24 | 85 | 43.4 | −0.2 |
| 7 | [1] 499.9 | 38.6 | 54.8 | 2(H$_2$O) | 24 | 85 | 54.0 | −0.8 |

[1] Reaction vessel was a covered beaker.

TABLE III

*Separations of RbCl-CsCl mixtures in a sealed tube at 110° for 24 hrs. using silver-exchanged analcite*

| Ag-analcite (mg.) | RbCl (mg.) | CsCl (mg.) | Residue (mg.) | Residue-blank correction (mg.) | Percent RbCl removed |
|---|---|---|---|---|---|
| 139.0 | 23.0 | 37.4 | 54.6 | 53.0 | 32 |
| 257.3 | 24.3 | 33.6 | 48.5 | 46.9 | 45 |
| 362.8 | 23.9 | 36.8 | 44.7 | 43.1 | 73 |
| 490.0 | 24.6 | 40.1 | 44.8 | 43.2 | 87 |
| 498.9 | 24.3 | 34.3 | 39.2 | 37.6 | 86 |
| 622.4 | 24.8 | 34.7 | 40.0 | 38.4 | 85 |

The above table shows that the degree of separation increases as the amount of silver-exchanged analcite increases up to a limiting value.

Further experiments were conducted in which the amount of solvent, the ratio of RbCl/CsCl in the original mixture, and also the reaction time varied. The results of these tests are shown in Tables IV, V and Vi, respectively.

TABLE IV

*Effect of solvent volume on RbCl-CsCl separations in a sealed tube at 110° C. for 24 hrs. using silver-exchanged analcite*

| Ag-analcite (mg.) | RbCl (mg.) | CsCl (mg.) | Volume H$_2$O (ml.) | Percent RbCl removed |
|---|---|---|---|---|
| 554.8 | 24.6 | 39.3 | 10 | 11.2 |
| 484.0 | 23.8 | 36.8 | 5 | 13.2 |
| 531.6 | 23.4 | 33.8 | 2 | 19.2 |

It can be seen that decreasing solvent volume has effect of increasing separation.

TABLE V

*Effect of RbCl-CsCl weight ratio on RbCl-CsCl separations in a sealed tube at 110° C. for 24 hrs. using silver-exchanged analcite*

| Ag-analcite (mg.) | RbCl (mg.) | CsCl (mg.) | RbCl/CsCl (weight basis) | Volume H$_2$O (ml.) | Percent RbCl removed |
|---|---|---|---|---|---|
| 471.9 | 13.3 | 32.8 | 0.41 | 5 | 7.6 |
| 484.0 | 23.8 | 36.8 | 0.65 | 5 | 13.2 |
| 494.0 | 24.2 | 16.3 | 1.48 | 5 | 21.7 |

It is thus shown that the separation is increased if RbCl is present in about equivalent or greater quantity than the CsCl.

TABLE VI

*Effect of reaction time on RbCl-CsCl separations in a sealed tube at 110° C. using silver-exchanged analcite*

| Ag-analcite (mg.) | RbCl (mg.) | CsCl (mg.) | Volume H$_2$O (ml.) | Reaction time (hr.) | Percent RbCl removed |
|---|---|---|---|---|---|
| 471.5 | 23.7 | 33.2 | 5 | 12 | 18.8 |
| 484.0 | 23.8 | 36.8 | 5 | 24 | 13.2 |
| 503.0 | 23.8 | 39.7 | 5 | 48 | 17.4 |

As may be seen, reaction time has negligible effect on separation of RbCl-CsCl mixtures.

The separations of this invention need not be in aqueous solution. In fact, the most successful separation of rubidium ion from cesium ion occurred in an organic solvent preferably a lower aliphatic alcohol, as indicated by the data of Table VII.

TABLE VII

*Separations of RbCl-CsCl mixtures in non-aqueous solvents in a sealed tube and under reflux conditions using silver-exchanged analcite*

| | | | | |
|---|---|---|---|---|
| Ag-analcite (mg.) | 544.3 | 534.8 | 536.4 | 453.9 |
| RbCl (mg.) | 23.2 | 23.7 | 24.5 | 23.4 |
| CsCl (mg.) | 37.5 | 33.1 | 37.7 | 33.8 |
| Solvent | $CH_3OH$ | $C_2H_5OH$ | $C_2H_5OH$ | $n-C_3H_7OH$ |
| Volume of solvent (ml.) | 5 | 5 | 2 | 5 |
| Time (hr.) | 24 | 24 | 24 | 24 |
| Temp. (° C.) | 110 | 78 | 110 | 97 |
| Residue | 39.0 | 50.0 | 39.5 | 48.4 |
| Residue-blank correction | 37.5 | 48.5 | 38.0 | 46.9 |
| Percent Rb removed | 100 | 35[1] | 99 | [1] 44 |

[1] Reaction was carried out under conditions in which the solvent boiled under reflux sufficiently vigorously to keep the exchanger in suspension.

It can be seen from Table VII that quantitative separations of rubidium from cesium can be obtained in closed systems using organic solvents, but not under reflux conditions.

While the invention has been illustrated by exchange reactions employing silver-zeolites and halide salts, it should not be so limited. The basic requirement for a quantitative exchange is that the exchangeable cation of the zeolite and the anion of the treating solution form insoluble precipitates. For example, solutions of carbonate, iodate, oxalate or thiocyanate anions could be used with a silver-exchange zeolite. Carbonate and fluoride anions could likewise be used with calcium-exchanged zeolites. Other combinations will be obvious upon examination of a table of chemical solubilities.

What is claimed is:

1. A process for separating sodium, potassium and rubidium ions from a mixture thereof with cesium ions in solution, the solvent being selected from the class consisting of water and lower aliphatic alcohols, said solution containing anions which form a substantially insoluble precipitate with silver ions, which process comprises: contacting said solution with silver exchanged analcite; and exchanging a substantial portion of said sodium, potassium and rubidium ions for silver ions in said analcite while precipitating said silver ions by formation of a substantially insoluble compound of silver ions and the anions in said solution, said cesium ions remaining in solution.

2. Process in accordance with claim 1 wherein said anions are halide ions.

3. Process for the essentially quantitative separation of sodium ions from cesium ions in a solution containing halide ions, the solvent being selected from the class consisting of water and lower aliphatic alcohols, which process comprises: contacting said solution with silver exchanged analcite; and exchanging substantially all the sodium ions for silver ions in said analcite while precipitating said silver ions as silver halide, said cesium ions remaining in solution.

4. Process for the essentially quantitative separation of potassium ions from cesium ions in a solution containing halide ions, the solvent being selected from the class consisting of water and lower aliphatic alcohols, which process comprises: contacting said solution with silver exchanged analcite; and exchanging substantially all the potassium ions for silver ions in said analcite while precipitating said silver ions as silver halide, said cesium ions remaining in solution.

5. Process for the essentially quantitative separation of rubidium ions from cesium ions in a lower aliphatic alcohol solution containing halide ions which comprises: contacting said solution with silver exchanged analcite at conditions outside the reflux conditions of said solvent; and exchanging substantially all the rubidium ions for silver ions in said analcite while precipitating said silver ions as silver halide, said cesium ions remaining in solution.

6. Process for the essentially quantitative separation of rubidium ions from cesium ions in a methyl alcohol solution containing halide ions which comprises: contacting said solution with silver exchanged analcite at a temperature outside the range of about 65° C.; and exchanging substantially all the rubidium ions for silver ions in said analcite while precipitating said silver ions as silver halide, said cesium ions remaining in solution.

7. Process for the essentially quantitative separation of rubidium ions from cesium ions in an ethyl alcohol solution containing halide ions which comprises: contacting said solution with silver exchanged analcite at a temperature outside the range of about 78° C.; and exchanging substantially all the rubidium ions for silver ions in said analcite while precipitating said silver ions as silver halide, said cesium ions remaining in solution.

8. Process for the essentally quantitative separation of rubidium ions from cesium ions in a n-propyl alcohol solution containing halide ions which comprises: contacting said solution with silver exchanged analcite at a temperature outside the range of about 97° C.; and exchanging substantially all the rubidium ions for silver ions in said analcite while precipitating said silver ions as silver halide, said cesium ions remaining in solution.

References Cited in the file of this patent

UNITED STATES PATENTS

| | | |
|---|---|---|
| 2,283,172 | Bates | May 19, 1942 |
| 2,326,323 | Benedict | Aug. 10, 1943 |
| 2,512,053 | Calmon | June 20, 1950 |
| 2,600,719 | Wood | June 17, 1952 |

OTHER REFERENCES

Kunin et al.: "Ion Exchange Resins," John Wiley and Sons, Inc. N.Y., 1950, pages 22, 25, 67, 68, 115 and 123.

Barrer et al. in "Journal of Chemical Society," May 1952, pp. 1561–1571.

Thorpe: "Thorpe's Dictionary of Applied Chemistry," Longmans, Green and Co., 4th ed., vol. 2, page 195; vol. 10, pp. 135, 636.

Hodgeman: Handbook of Chemistry and Physics, 1951–1952, pp. 2820–22.